United States Patent [19]

Budniak et al.

[11] 4,282,471

[45] Aug. 4, 1981

[54] CONTROL SYSTEM FOR A MULTI-PHASE MOTOR

[75] Inventors: Mitchell S. Budniak, Skokie; Donald P. Martin, Wheeling, both of Ill.

[73] Assignee: Qwint Systems Inc., Northbrook, Ill.

[21] Appl. No.: 38,946

[22] Filed: May 14, 1979

[51] Int. Cl.³ .................................................. G05B 19/40
[52] U.S. Cl. .................................. 318/685; 318/696; 318/138; 318/254
[58] Field of Search ................ 318/696, 685, 254, 138

[56] References Cited

U.S. PATENT DOCUMENTS

| | | | |
|---|---|---|---|
| 4,032,827 | 6/1977 | Dobratz et al. | 318/696 |
| 4,065,708 | 12/1977 | Ulland et al. | 318/696 |
| 4,136,308 | 1/1979 | King | 318/696 |

*Primary Examiner*—J. V. Truhe
*Assistant Examiner*—Eugene S. Indyk
*Attorney, Agent, or Firm*—Lockwood, Dewey, Alex & Cummings

[57] ABSTRACT

A motor control system for use in a high speed teleprinter or the like for controlling the rotational position and movement of a rotor, and apparatus driven by the rotor, by detecting back EMF induced into an unenergized field winding by rotational movement of the rotor. The output and input terminals of a first amplifier responsive to a first motor control signal, and a second amplifier responsive to a second motor control signal, are reactively coupled such that the amplifiers respond to either motor control signal to develop a signal simulating the signal into an unenergized winding of the motor due to mutual inductance with an energized winding. A differential voltage comparator provides a feedback signal indicative of motor performance upon comparing the simulated signal with the signal actually induced. In the illustrated teleprinter application, the feedback signal is utilized to control energization of the carriage drive motor to assure accurate positioning of the teleprinter print head, and to provide an accurate indication of actual print head position to the signal processing circuitry of the teleprinter.

40 Claims, 12 Drawing Figures

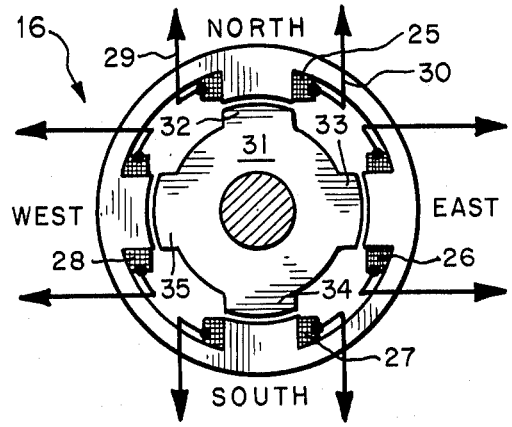
FIG. 2
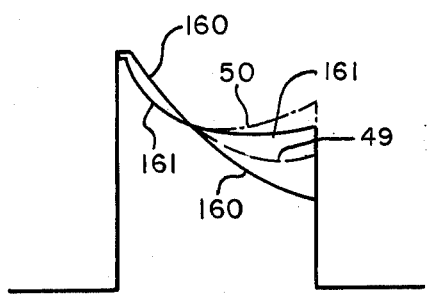
FIG. 5
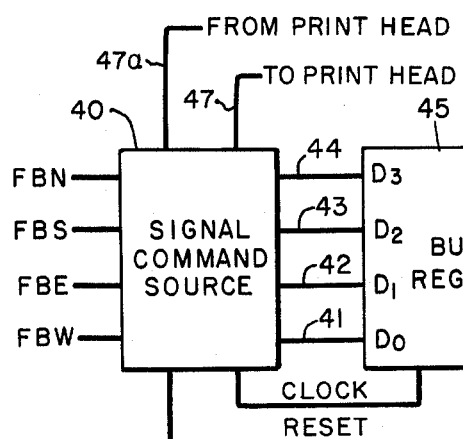
FIG. 3
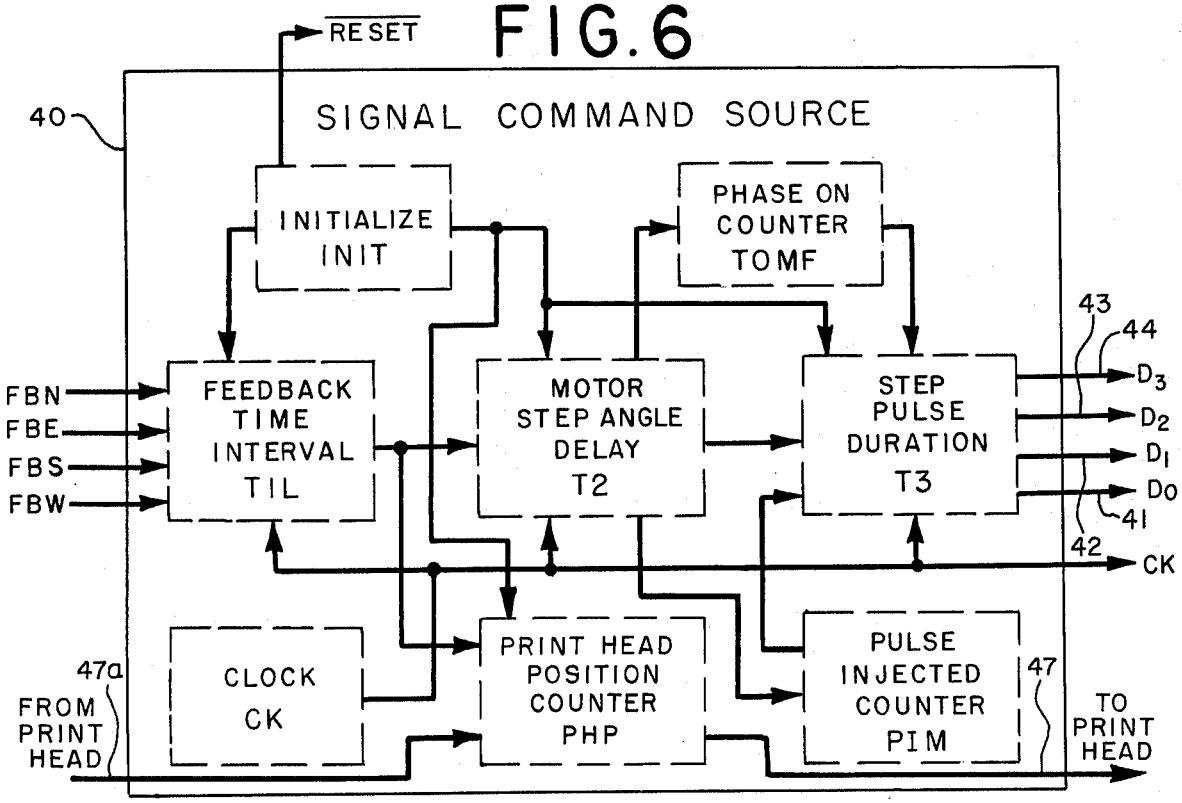

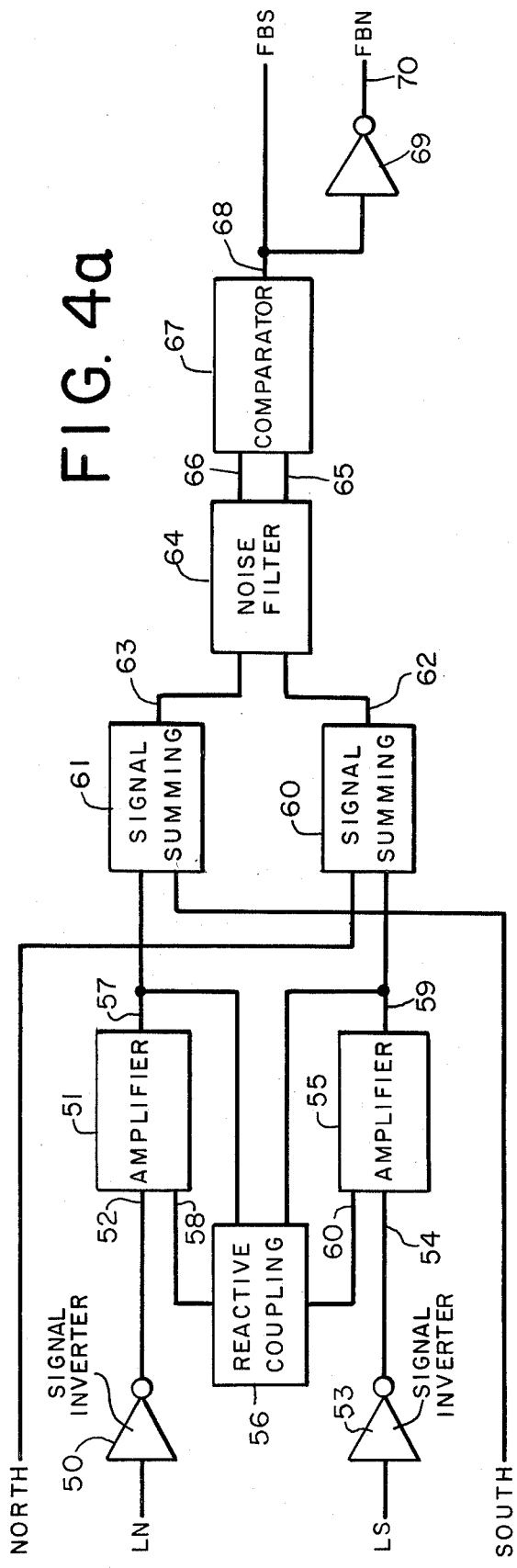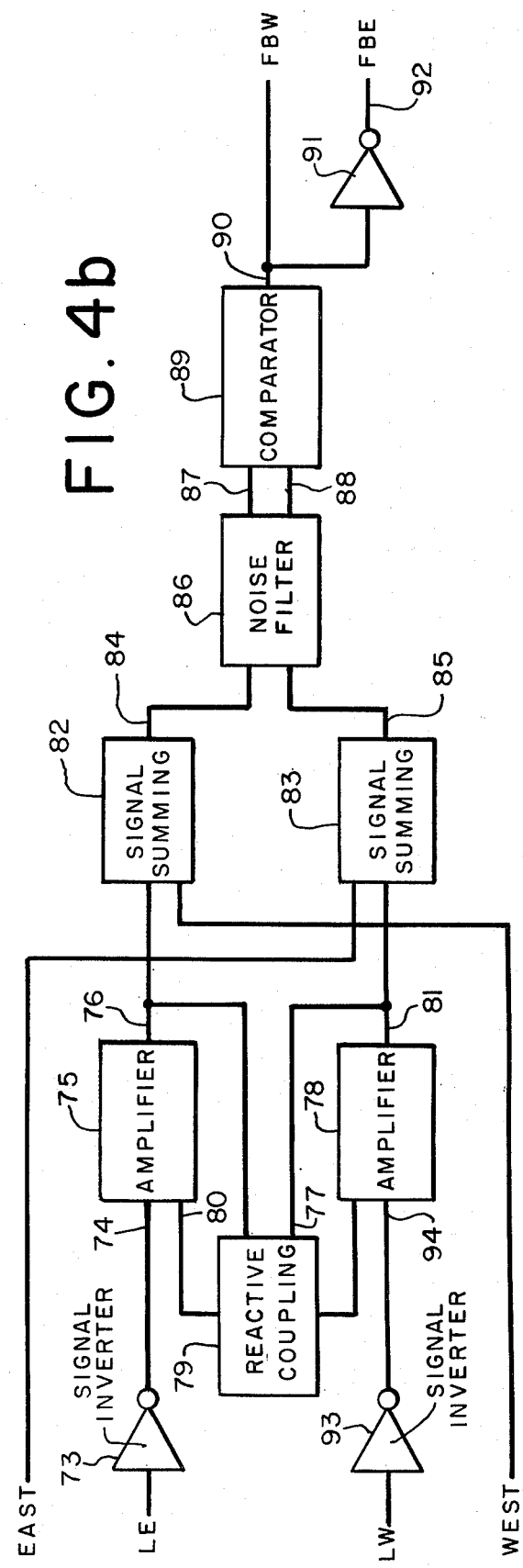

| CLOCK CYCLE | SP ON | SP OFF | $Q_3Q_2Q_1Q_0$ |
|---|---|---|---|
| 1 | 0 0 0 0 | 0 0 0 0 | 1 0 0 0 |
| 2 | 0 0 0 0 | 0 0 0 0 | 1 0 0 0 |
| 3 | 0 0 0 0 | 0 0 0 0 | 1 0 0 0 |
| 4 | 0 1 0 0 | 0 0 0 0 | 1 0 0 0 |
| 5 | 0 0 0 0 | 0 0 0 0 | 1 1 0 0 |
| 6 | 0 0 0 0 | 0 0 0 0 | 1 1 0 0 |
| 7 | 0 0 0 0 | 0 0 0 0 | 1 1 0 0 |
| 8 | 0 0 1 0 | 1 1 0 0 | 1 1 0 0 |
| 9 | 0 0 0 0 | 0 0 0 0 | 0 0 1 0 |
| 10 | 0 0 0 0 | 0 0 1 0 | 0 0 1 0 |
| 11 | 0 0 0 0 | 0 0 0 0 | 0 0 0 0 |
| 12 | 0 0 0 1 | 0 0 0 0 | 0 0 0 0 |
| 13 | 0 0 0 0 | 0 0 0 1 | 0 0 0 1 |
| 14 | 0 0 0 0 | 0 0 0 0 | 0 0 0 0 |
| 15 | 0 0 0 0 | 0 0 0 0 | 0 0 0 0 |
| 16 | 1 0 0 0 | 0 0 0 0 | 0 0 0 0 |
| 17 | 0 0 0 0 | 0 0 0 0 | 1 0 0 0 |

CONTROL SYSTEM FOR A MULTI-PHASE MOTOR

BACKGROUND OF THE INVENTION

This invention relates in general to a control system for a motor wherein a plurality of electromagnetic field windings are separately energized to control the rotational position and movement of a rotor, and/or apparatus driven by the rotor, and more particularly to a control system which detects back EMF induced as a result of rotor rotation, to develop a feedback signal useful for controlling operation of the motor or detecting the operating state of apparatus driven by the motor. The control system of the invention is particularly useful in controlling the operation of a print head positioning motor in a high speed teleprinter wherein it is necessary that the print head be positioned and controlled with a high degree of accuracy.

It has been common practice in the electric motor arts to use a tachometer or the like driven either directly or indirectly from the rotor shaft of a motor to determine the speed and other operational parameters of the motor. It has also been common practice to utilize the output signal from the tachometer in a feedback loop to control energization of the motor to achieve a desired standard of motor performance including the maintainance of uniform motor speeds with variations in load, and the optimizing of acceleration and deceleration characteristics of the motor.

More recently, other means of sensing motor speed and performance have come into use. For example, optical pickup systems, wherein rotation of an opaque disc with radially disposed transparent slots is sensed by means of a light source on one side of the disc and a photoelectric sensor on the opposite side of the disc, have been coupled to a motor rotor to detect motor rotation. Unfortunately, errors may be introduced by these optical pickups due to eccentricites in the disc or in the mounting of the disc to the rotor shaft. Even slight eccentricities of the slot in relation to the axis of the rotor shaft can cause the photoelectric sensor to detect false acceleration and deceleration for each rotation of the rotor shaft. Moreover, where such discs are used with stepping motors and the intertia of the load is small, the disc may undesirably add to the rotational inertia of the rotor and detract from the acceleration or deceleration performance of the motor. Furthermore, such optical detection systems undesirably add to the space required by the motor, and to the complexity and cost of the apparatus in which they are utilized.

Other techniques have previously been employed to attempt to recover and utilize the back EMF induced into a motor winding to detect and control performance of the motor. In one such attempt the back EMF was recovered by using an additional winding in the motor. However, since the additional sense winding had to be magnetically shielded from the field windings to avoid inducing drive signals into the sense windings, this approach undesireably added to the bulk, weight and cost of the motor.

It is therefore a primary object of the present invention to provide a new and improved motor control system wherein back EMF generated during operation of a motor is recovered and utilized to control the operation of the motor.

A more specific object of the present invention is to provide reactive coupling between inputs and outputs of a pair of operational amplifiers responsive to respective motor control signals to simulate the signal induced into an unenergized winding of the motor.

A further object of the present invention is to provide signal summing between the outputs of the operational amplifiers and a pair of inputs of a comparator amplifier such that the comparator compares a simulated signal from the electronic circuitry with the induced signals in each of a pair of motor field windings in generally 180° phase relationship.

Yet another object of the present invention is to provide such circuitry for detecting the back EMF for each pair of electromagnetic field windings of the motor having mutual inductance therebetween.

A further object of the present invention is to provide a method of detecting the back EMF induced into an unenergized winding by rotational movement of the rotor, wherein the back EMF is superimposed upon another signal induced into the unenergized winding because of mutual inductance with an energized winding, including the steps of electronically simulating the signal induced into the unenergized winding because of mutual inductance with the energized winding, but with the simulated signal having no back EMF superimposed thereon, comparing the simulated signal to the signal induced into the unenergized winding with the back EMF superimposed thereon to detect the back EMF, and utilizing the detected back EMF to control subsequent energization of the motor field windings, to detect position of apparatus driven by the rotor, or to actuate such apparatus.

SUMMARY OF THE INVENTION

These advantages of the invention, and others, including those inherent in the invention, are provided by a system for simulating the signal induced into an unenergized winding because of mutual inductance with an energized winding in a motor having a blocked rotor. The simulated signal may then be compared with an induced signal in an unenergized field winding of a motor with a freely rotating rotor to detect the back EMF superimposed thereon because of rotor movement. The electronic circuitry forms a feedback loop adapted to control energization of the electromagnetic field windings of the motor based upon feedback signals developed by the loop, or to alternatively determine the position of apparatus driven by the rotor or to actuate such apparatus when in the desired position.

A pair of operational amplifiers are each responsive to one of a plurality of logic signals also used to control energization of the field windings of the motor. A reactive coupling network is connected between outputs and certain inputs of the pair of amplifiers such that the amplifiers respond to a logic signal at either amplifier to simulate the signal induced into the unenergized winding of the motor due to mutual inductance with an energized winding. Complementary simulated signals at the output of each amplifier pass through a summing network for presentation to opposite cues of a pair of inputs to a differential voltage comparator. The signal induced into the unenergized field winding with the back EMF superimposed thereon is presented to an input of the voltage comparator. Preferably, noise filtering is provided between the inputs of the voltage comparator to avoid false comparator output signals. Upon detection of the back EMF, the voltage comparator changes in output state. The output of the voltage comparator may be utilized by a signal command source, such as a microprocessor which generates the logic signals for controlling energization of the motor windings, to determine the phase relationship between the detected back EMF and one of the logic signals to control further energization of the motor, to determine or control the position of apparatus driven by the motor, or to actuate such apparatus when in the desired position.

The present invention is also concerned with methods of controlling rotor rotation in a motor having at least a pair of the field windings with mutual inductance therebetween. The method includes the steps of electronically simulating the signal induced into an unenergized winding because of mutual inductance with an energized winding with the simulated signal having no back EMF superimposed thereon, and comparing the signal induced into the unenergized winding, with the back EMF due to rotor rotation superimposed thereon, to the simulated signal to detect the back EMF and hence, rotational movement of the rotor. The detected back EMF may then be utilized to control further energization of the motor or the position of apparatus driven by the motor. The step of electronically simulating the signal induced into the unenergized winding without any back EMF includes the substeps of inputting a logic signal used to control energization of the energized winding into a first amplifier which is reactively coupled to a second amplifier, whereby each amplifier generates complementary portions of the simulated signal in response to reactive coupling of a change in output of the first amplifier to said logic signal.

BRIEF DESCRIPTION OF THE DRAWINGS

Features of the present invention which are believed to be novel and patentable, are set forth with particularity in the appended claims. The invention together with the further advantages thereof can best be understood by reference to the following description taken in conjunction with the accompanying drawings and the several figures in which like reference numerals identify like elements, and in which:

FIG. 2 is a simplified diagrammatic view of a four-phase stepping motor useful in explaining the operation of the invention.

FIG. 3 is a block diagram illustrating a signal command source and a buffer register for generating a plurality of logic signals in response to a plurality of feedback signals at the signal command source, the logic signals being suitable for controlling energization of pairs of electromagnetic field windings having mutual inductance therebetween.

FIG. 4a is a simplified block diagram of the motor control system of the invention for simulating a signal comparable to the signal induced into the unenergized field winding, but without any back EMF, and for comparing the simulated signal to the induced signal having the back EMF superimposed thereon to detect the back EMF and to provide a feedback signal upon detection of the back EMF.

FIG. 4b is a block diagram similar to FIG. 4a, but for detecting the back EMF from a different pair of motor windings also having mutual inductance therebetween and for providing respective feedback signals.

FIG. 5 is a graphic diagram of the simulated signal without back EMF and the induced signal with back EMF, the simulated and induced signals being superimposed for magnitude comparison by the comparator in FIG. 4a or 4b.

FIG. 6 is a block diagram of the signal command source in FIG. 3 illustrating the operation of the signal command source in greater detail.

FIG. 10 is a graphic diagram illustrating how certain logic signals may vary energization of the field windings between fractional-phase-on to two-phase-on.

FIG. 11 is a logic table illustrating how the signal command source generates the logic signals used to control energization of the motor windings in the various phase-on modes.

DESCRIPTION OF THE PREFERRED EMBODIMENTS

Figure 1:
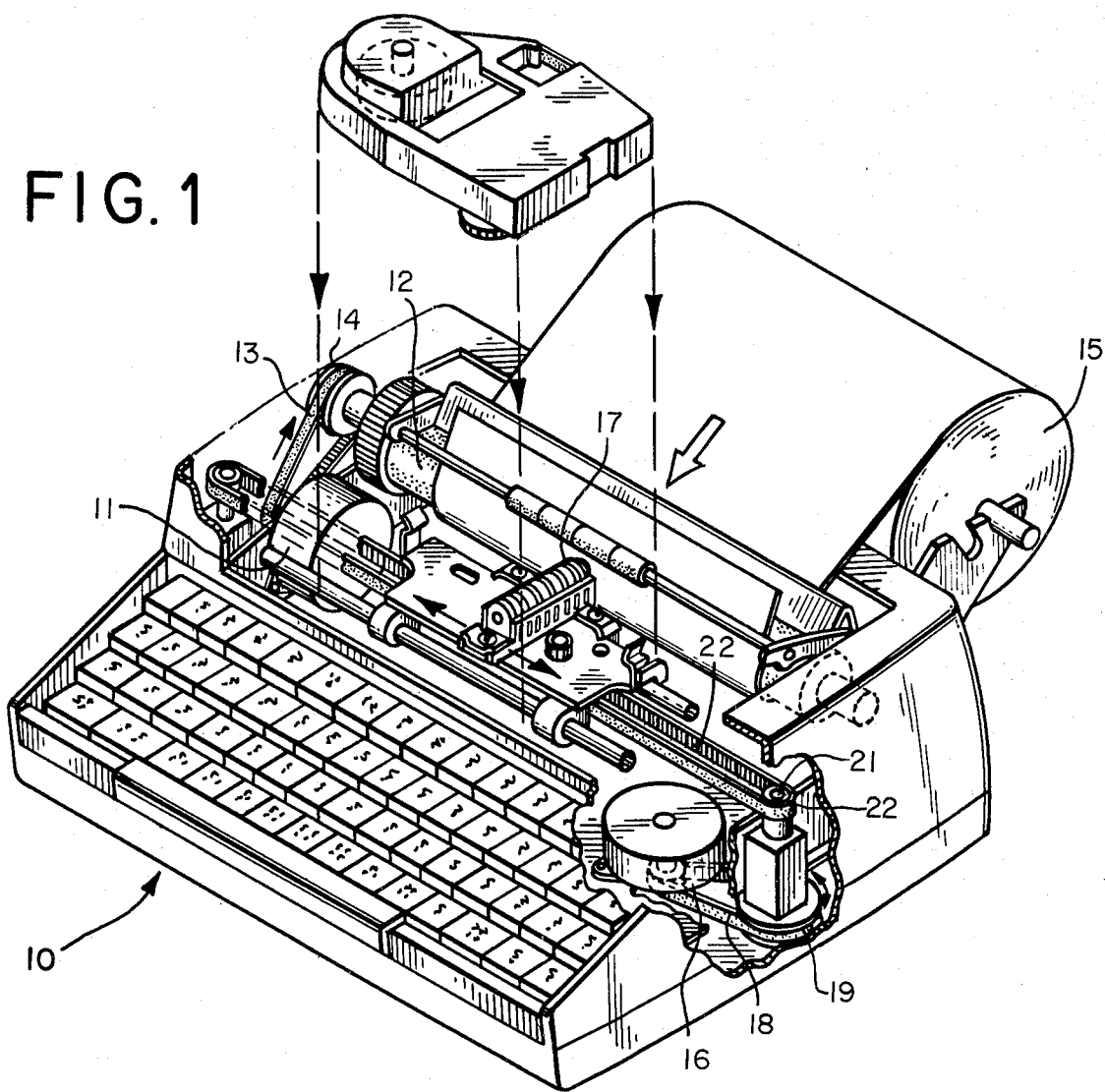
FIG. 1 is a perspective view, partially broken away, illustrating a pair of stepping motors utilized in a teleprinter to provide linear transverse movement of a printing head in proximity to a platen and to rotate the platen to feed paper through the teleprinter.

Referring to FIG. 1, there is shown a teleprinting unit, generally designated 10, having a first stepping motor 11 adapted to rotate a platen 12 by means of a cogged belt 13 and a clogged pulley 14 fixedly secured to one end of the platen. Stepping motor 11 precisely rotates platen 12 to feed paper about the platen in either roll form, such as from roll 15, or in sheet form.

A second stepping motor 16 is provided to move a print head 17 transversely along and in proximity to platen 12 for printing alpha-numeric characters on the paper. To this end, stepping motor 16 drives a cogged belt 18 and a cogged pulley 19. Pulley 19 is coupled to a pulley 20 by a shaft 21. Pulley 21 drives a cogged belt 22 to which print head 17 is secured so as to position the print head in a desired position along the paper sheet.

In order for print head 17 to print the desired information on the paper sheet from roll 15 in a highly efficient manner, stepping motor 16 should be capable of operating at a wide range of speeds and further be capable of good acceleration and deceleration performance. That is, while stepping motor 11 may feed the paper over platen 12 at a single or narrow range of speeds, it is desirable that stepping motor 16 cause printing head 17 to sweep transversely across the paper sheet at a wide range of speeds depending upon the amount and type of information to be printed. Since any variation in performance of this motor will adversely affect printing performance, it is desirable to monitor the performance of the motor on a real time basis and to control the energization of the motor to correct for any deficiencies in motor performance.

To better understand and appreciate the present invention, a four-pole, two-phase stepping motor is shown in simplified diagrammatic form in FIG. 2. For convenience, the four field or stator pole positions are indicated by the primary compass points of North, East, South and West. It is understood in this context that North and South refer to angular positions and not to magnetic polarization. A separate field winding 25, 26, 27 or 28 is provided for electromagnetization of each of respective field pole position North, East, South or West. Each of windings 25, 26 27 and 28 have a pair of terminals 29 and 30 for connection to a source of electrical energization, as will be discussed in greater detail hereinafter. A rotor 31 of stepping motor 16 is mounted in the motor for rotation in a known manner and has a plurality of permanently magnetized poles 32, 33, 34 and 35. The number of rotor poles may not necessarily equal the number of field poles so as to obtain smaller incremental angular stepping action of rotor 31. It is also known to those skilled in the art that field poles North, East, South and West may each occupy a plurality of angular positions within the motor such that stepping motor 16 may, for example, require 200 steps for rotor 31 to complete one revolution. Furthermore, pairs of field windings, such as windings 25 and 27 and windings 26 and 28, may be magnetically separated by use of the well known canstacking arrangement such that only certain pairs of field windings have mutual inductance therebetween. Rotation of rotor 31 is effected by selective energization of field windings 25, 26, 27 and 28, usually sequentially and one at a time, to create magnetic attraction between one of the field poles North, East, South or West and one of the permanently magnetized rotor poles 32, 33, 34 or 35 such that rotor 31 rotates to a new angular position.

With reference to FIG. 3, there is shown in block diagram form circuitry for selectively energizing field windings 25, 26, 27 or 28. A signal command source 40 selectively provides energization signals on a plurality of output lines 41, 42, 43 and 44 to a respective plurality of input terminals D0, D1, D2 and D3 of a buffer register 45. Signal command source 40 also supplies a clock signal CK and a reset signal $\overline{RES}$ to buffer register 45, and may supply actuation and/or control signals to print head 17 via at least one line 47. Register 45 supplies an output logic west signal LW on an output terminal Q0, an output logic south signal LS on an output terminal Q1, an output logic east signal LE on an output terminal Q2 and an output logic north signal LN on an output terminal Q3.

Output logic signals LN, LE, LS and LW are utilized by a plurality of on/off winding drivers 46 to cause selective energization of respective field windings 25, 26, 27 or 28 from a voltage supply $V_B$ in accordance with the state of logic signals LN, LE, LS and LW. For example, if voltage supply $V_B$ is positive, output states of winding drivers 46 will normally be high. To energize one of field windings 25, 26, 27 or 28, the appropriate output line from winding driver 46 will assume a low state to apply the positive voltage from voltage supply $V_B$ across one of the field windings. If it is desired to selectively energize winding 25, a NORTH signal from winding driver 46 will assume the low state. Because of mutual inductance between North winding 25 and South winding 27, a signal will be induced into South winding 27 upon energization of North winding 25 which will exponentially decay in accordance with the inductance to resistance ratio L/R time constant of winding 27 as seen in curve 161 in FIG. 5. As rotor 31 begins to rotate in response to the energization of winding 25, a back EMF will be developed as rotor 31 moves through the magnetic field created by energization of winding 25. This back EMF will also be induced into south winding 27 and will be superimposed upon the signal induced into winding 27 by energization of winding 25. This superimposed back EMF is identified by a portion of a sine wave 48 superimposed on the exponential decay of signal 161 in FIG. 5. Depending upon whether rotor 31 is leading or lagging energization of winding 25, the back EMF wave 48 may shift in phase relationship to signal 161, as indicated by respective dashed waves 49 and 50 in FIG. 5. The presence of back EMF wave 48 therefore provides latent information concerning whether rotor 31 is rotating in response to energization of windings 25, 26, 27 or 28 and the phase of wave 48 relative to signal 161 provides information concerning whether rotor 31 is leading or lagging energization of the field windings. Detection and recovery of back EMF wave 48 is therefore potentially useful for determining the response of rotor 31 to energization of stepping motor 16 and for developing a feedback or error signal to control subsequent energization of the field windings to maintain or to change the response of the rotor. Since stepping motor 16 is preferably of the permanent magnet type, i.e. has a permanently magnetized rotor 31, back EMF sine wave 48 will be generated as long as rotor 31 is moving and is independent of motor winding energization. At higher rotor speeds, the back EMF wave will become more pronounced and the L/R decay of induced signal 161 will become less pronounced. However, these voltage waveforms are not nearly as speed depenedent as the change in magnitude of the motor current signals. Furthermore, comparison of the signal induced into an unenergized motor winding to the simulated signal to recover the back EMF sine wave is ordinarily accomplished during energization of another motor winding having mutual inductance with the unenergized winding such that little noise or transients are then present to cause errors in the signal comparison. The circuitry and methods of the present invention therefore yield improved operational accuracy. Unlike the variable reluctance motor, which provides no back EMF when the windings are unenergized, a permanent magnet motor provides back EMF during such unenergized conditions. The position of the rotor and of apparatus driven by the rotor may therefore be accurately determined by monitoring and accumulating information on the back EMF independently of winding energization.

Electronic circuitry for detecting back EMF wave 48 upon the decaying exponential signal induced into an unenergized winding of a pair of windings having mutual inductance therebetween is illustrated in block diagram form in FIG. 4a. Logic north signal LN from FIG. 3 is inverted by a signal inverter 50 and the inverted signal is presented to one of a pair of input terminals 52 of a first operational amplifier 51. Logic south signal LS is similarly inverted by a signal inverter 53 and presented to an input terminal 54 of a second operational amplifier 55. A reactive coupling network 56 is connected between an output terminal 57 and a second input terminal 58 of amplifier 51 and between an output terminal 59 and a second input terminal 60 of amplifier 55. Reactive coupling network 56 causes the amplifiers 51 and 55 to coact and simulate complementary portions of the L/R exponential decay of a signal induced into an unenergized field winding in response to the presence of one of the respective logic signals LS or LN. For example, the presence of logic signal LN will cause amplifier 55 by way of a change in output of amplifier 51 at output terminal 57, which is transmitted by reactive coupling network 56 to input terminal 60 of amplifier 55, to cause amplifiers 51 and 55 to generate complementary portions of simulated signal 160 in FIG. 5. That is, amplifiers 51 and 55 will effectively generate the exponentially decaying simulated signal 160 without any back EMF when the complementary signals from amplifiers 51 and 55 are summed in an opposite polarity manner, as by opposite polarity input terminals 65 and 66 of a comparator 67. Signal 160 is the type of signal which is induced into an unenergized winding in a motor with a blocked rotor by energization of another winding having mutual inductance with the unenergized winding.

One of the complementary signals at output terminal 59 of amplifier 55 and NORTH signal from field winding 25 in FIG. 3 are summed by a signal summing network 60. The output of amplifier 51 at terminal 57 is similarly summed with SOUTH signal from field winding 27 in FIG. 3 by a signal summing network 61. Separate outputs of signal summing networks 60 and 61 on a pair of respective output lines 62 and 63 are filtered by a noise filter 64 and then presented to a respective pair of input terminals 65 and 66 of a voltage comparator 67. Comparator 67 therefore compares the complementary signals on input terminals 65 and 66 which are oppositely summed to effectively yield simulated signal 160 in FIG. 5, to SOUTH signal from unenergized field winding 27 at second input terminal 66, such that comparator 67 detects back EMF wave 48 to provide a change in output state on an output line 68. That is, simulated signal 160 in FIG. 5 is slightly greater in magnitude than SOUTH signal 161 except during that part of the SOUTH signal 161 when back EMF pulse 48 causes signal 161 to exceed the magnitude of simulated signal 160. Comparator 67 then provides an output pulse on line 68 indicating the detection of back EMF pulse 48. This output pulse is inverted by an inverter 69 to provide a feedback North signal FBN on an output line 70. As previously discussed, signal FBN is input into signal command source 40 in FIG. 3.

In a like manner, when logic south signal LS causes South field winding 27 to become energized, the circuitry of FIG. 4a detects the presence and phase relationship of a back EMF wave 48 induced by movement of rotor 31 into unenergized North field winding 25 because of mutual inductance between windings 25 and 27. In this respect it should be noted that logic signals LN and LS are normally 180° out of phase. Logic signals LN and LS are therefore never present at the same time, which could otherwise suppress induced signal 161 by simultaneously energizing windings 25 and 27. Upon the occurrence of logic signal LS, signal inverter 53 inverts signal LS and causes amplifier 55 to change in output on terminal 59 which is coupled to input terminal 58 of amplifier 51 by reactive coupling network 56. Amplifiers 51 and 55 coact and provide complementary portions of simulated signal 160 as seen in waveforms LNA and LSA in FIGS. 9 and 12. Signal summing network 61 sums the output of amplifier 51 with SOUTH signal from South field winding 27 and signal summing network 60 sums the output of amplifier 55 with NORTH signal from energized North field winding 25 which contains back EMF pulse 48 superimposed thereon. After filtering by noise filter 64, separate signals from signal summing networks 60 and 61 at respective inputs 65 and 66 are compared in magnitude by voltage comparator 67 to detect back EMF wave 48 from North field winding 25 and to then provided an output pulse on line 68 in the form of a feedback south signal FBS, which is, similar to the other feedback signals FBN, FBE and FBW, a squared up sine wave. That is, each of the feedback signals is a square wave related in frequency and phase to the back EMF induced in the associated motor winding and which back EMF is recovered by the circuitry in FIGS. 4a and 4b.

Circuitry similar to FIG. 4a in FIG. 4b detects back EMF pulses induced into East and West field windings 26 and 28. A logic east signal LE, which controls energization of East field winding 26, is inverted by a signal inverter 73. The output of inverter 73 is connected to an input terminal 74 of a first operational amplifier 75 and causes amplifier 75 to change in output at an output terminal 76. Any change at terminal 76 is presented to an input terminal 77 of a second operational amplifier 78 and to a second input terminal 80 of the first amplifier 75 by a reactive coupling network 79. Amplifiers 75 and 78 respond to such reactive coupling to provide complementary portions of simulated signal 160 (FIG. 5) at respective output terminals 76 and 81, which then oppositely summed are related to signal 161 induced into unenergized West field winding 28 upon energization of East field winding 26, but without any back EMF wave 48 superimposed thereon. A signal summing network 82 combines the output of amplifier 75 at terminal 76 with WEST signal from unenergized West field winding 28 in FIG. 3. Another signal summing network 83 similarly combines the output of second amplifier 78 at terminal 81 with EAST signal from unenergized East field winding 26. Outputs of signal summing networks 82 and 83 upon a pair of respective output lines 84 and 85, after filtering by a noise filter 86, are presented to a pair of input terminals 87 and 88 of a differential voltage comparator 89. In a manner similar to voltage comparator 67 in FIG. 4a, comparator 89 in FIG. 4b oppositely sums and compares the complementary portions of simulated signal 160 from the amplifiers 75 and 78 to signal 161 induced into unenergized West field winding 28 with back EMF wave 48 superimposed thereon. When back EMF wave 48 causes induced signal 161 to exceed simulated signal 160, comparator 89 changes in output state on an output line 90 which is inverted by a signal inverter 91 to provide an east feedback signal FBE on an output line 92 of the inverter.

The circuitry of FIG. 4b operates in a related manner in response to a logic west signal LW, which is generally 180° out of phase with logic east signal LE, and controls energization of West field winding 28. A signal inverter 93 inverts signal LW and presents the inverted signal to a second input 94 of amplifier 78. Amplifier 78 thereupon changes in output at output terminal 81 which is coupled by reactive coupling network 79 to input terminal 80 of amplifier 75. Amplifiers 75 and 78 respond by simulating complementary portions of signal 160. After summing of output terminal 76 with WEST signal by signal summing network 82 and filtering by noise filter 86, one portion of simulated signal 160 is presented to input 87 of voltage comparator 89. A complementary portion of simulated signal 160 and induced signal 161, after passing through signal summing network 83 and noise filter 86, are presented to input terminal 88 of comparator 89. Comparator 89 responds to back EMF wave 48 present in induced signal 161 by changing in output state at output terminal 90 of the comparator to provide the feedback west signal FBW to signal command source 40 in FIG. 3.

Signal command source 40 of FIG. 3 is shown in greater detail in FIG. 6 and may encompass a wide variety of circuits suitable for generating signals on output lines 41, 42, 43 and 44 for subsequent energization of respective field windings 28, 27, 26 and 25. Signal command source 40 is responsive to at least one of feedback signals FBN, FBE, FBS and FBW to change the duration of the energization signals on respective output lines 44, 43, 42 and 41, as will be more fully appreciated hereinafter. A preferred embodiment of signal command source 40 is a microprocessor integrated circuit, such as type 8080 commercially available from Intel Corporation of Santa Clara, Calif. 95051. Signal command source 40 includes a number of internal subcircuits or functions. A clock signal CK provides time reference and synchronizing signals for other internal and external circuitry. A feedback time interval counter T1L measures the time between the last two feedback pulses, such as FBN, FBE, FBS or FBW, as by counting down from a preset value such as 256 with each count representing a fixed increment of time such as 104.2 microseconds. If such a down counter reaches zero, then this would mean that no feedback signal was received within a predetermined time interval such as 26.667 milliseconds. The lack of a feedback signal indicates that rotor 31 of motor 16 has stalled or that a feedback pulse was not detected. A motor step angle delay T2 measures the delay from receiving a feedback pulse FBN, FBE, FBS or FBW to the beginning of the next step of the motor, also by means of a counter. A step pulse duration T3 stores the pulse duration currently being used. Step pulse duration T3 is responsive to feedback time interval T1L and to motor step angle delay T2 to increase the pulse duration on an output line 41, 42, 43 or 44 if more power is required by the motor to maintain desired operation, or to decrease the pulse duration if less power is required. Step pulse duration T3 therefore controls the selective time for which any field winding 25, 26, 27 or 28 of the motor is energized. When the motor first starts stepping, the T3 period is initialized to a maximum value so that maximum energization is applied to the motor for maximum starting torque. As the motor begins to approach steady state operating conditions, step pulse duration T3 may be decreased so that the motor will receive just enough power to maintain the desired performance. A pulse injection counter PIM is responsive to a zero or negative count in motor step angle delay T2 to cause step pulse duration T3 to inject another pulse just before the next feedback pulse occurs. A phase on counter TOMF is responsive to motor step angle delay T2 to limit the number of phases turned on, i.e. the number of field windings energized, by step pulse duration T3 to no more than two phases at any time so as to maintain control over the stepping action of rotor 31. Since energization of North field winding 25 and South field winding 27 are normally about 180° out of phase and East field winding 26 and West field winding 28 are similarly about 180° out of phase, phase on counter TOMF also prevents simultaneous energization of windings 25 and 27 or of windings 26 and 28 which could interfere with detection of the back EMF developed in an unenergized winding of a pair of windings having mutual inductance therebetween. Signal command source 40 also provides external clock and reset signals for control of buffer register 45.

Figure 1A:
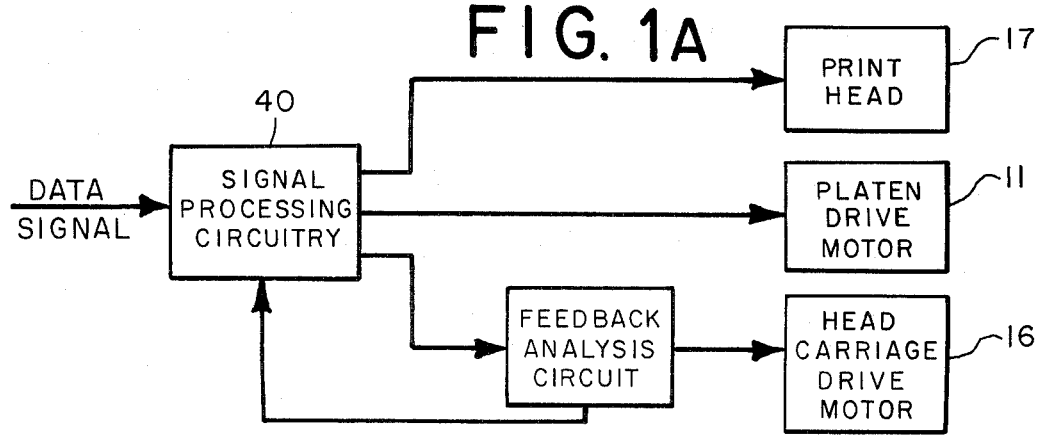
FIG. 1a is a simplified functional block diagram of the signal processing and print control circuitry of the teleprinter.

Signal command source 40 also has a print head position counter PHP which receives feedback pulse information from feedback time interval counter T1L and from print head 17 via at least one line 47a. Print head position counter is initialized by initialize INIT internal in command source 40 or by information from print head 17 via at least one line 47a or from other apparatus in teleprint unit 10 which indicates that print head 17 has been indexed to the left hand margin, or alternatively the right hand margin in the event that print head 17 prints in both directions. Thereafter, counter PHP can accumulate the number of feedback pulses FBN, FBE, FBS and FBW that have occurred and thereby determine the position of the print head between the margins. Since print head 17 is positively driven from the rotor of motor 16 by splined or gear type belts, each incremental movement of the rotor between motor pole positions moves the print head a known predetermined distance along carriage roll 12. Since each incremental move or step of the permanently magnetized rotor induces back EMF into an unenergized winding, the present position of print head 17 is easily determined from the number of back EMF detections since last indexing the print head to one of the margins. Thus, detection of back EMF can be utilized to determine the position of print head 17 and/or to control the actuation of the print head when in the proper position, as illustrated by the simplified functional block diagram of FIG. 1A.

Figure 7:
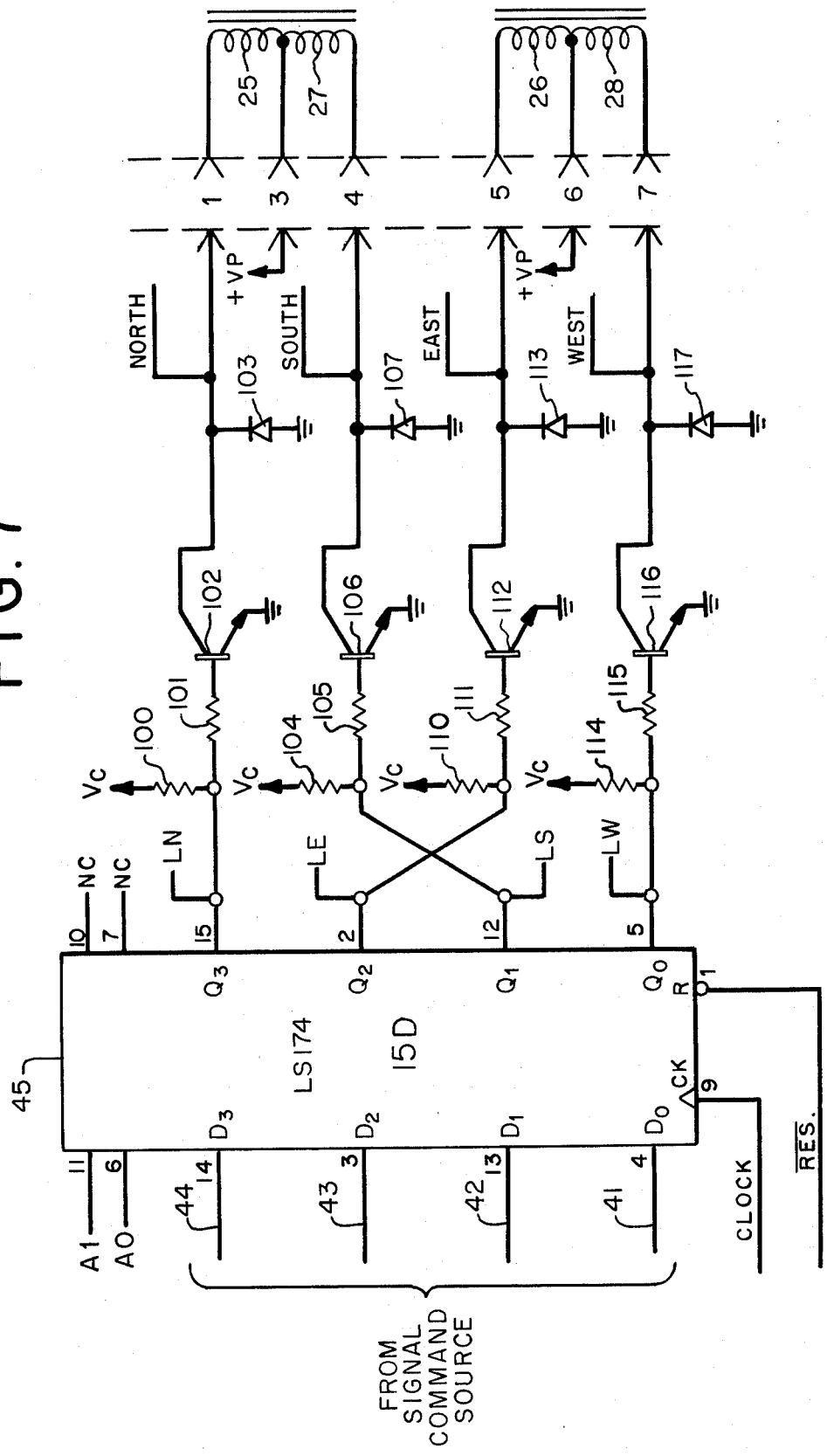
FIG. 7 is an electrical schematic diagram of the buffer register and winding drivers in FIG. 3 for energizing the field windings of the motor.
Figure 9:
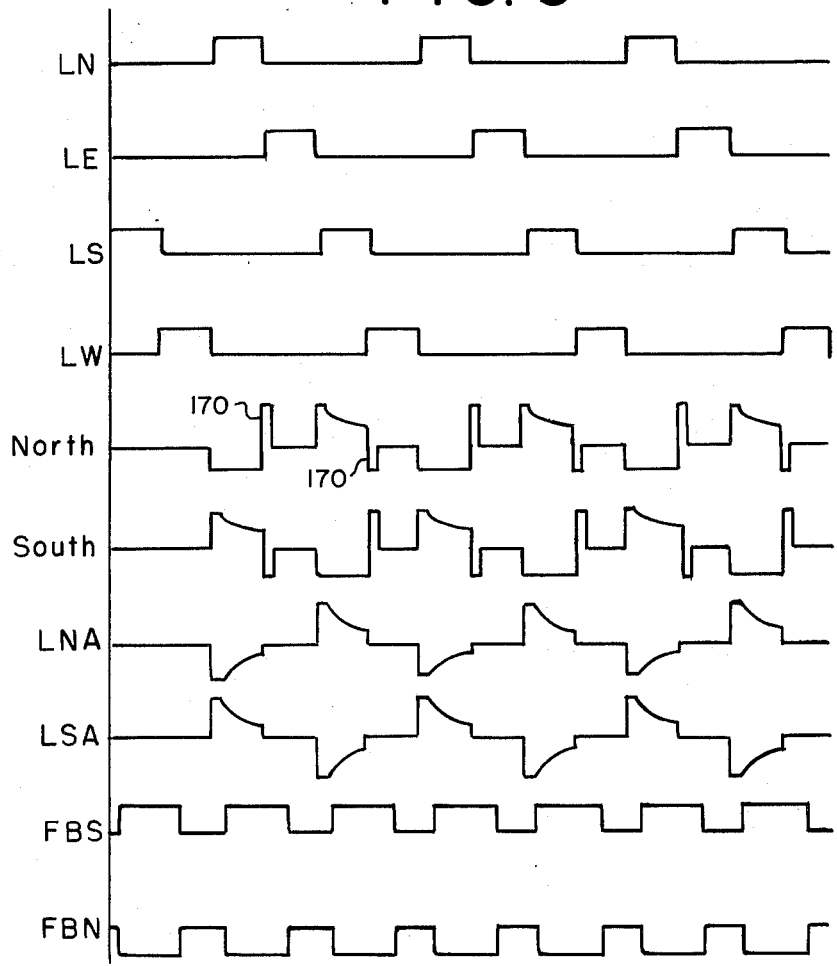
FIG. 9 is a graphic diagram of various electrical signals developed by the circuitry of the present invention during one-phase-on energization of the motor windings.

The remaining circuitry of FIG. 3 is illustrated in schematic diagram in FIG. 7. Outputs from signal command source 40 on lines 41, 42, 43 and 44 are input into 4 bit buffer register 45 at respective input terminals D0, D1, D2 and D3. Signals present at input terminals D0, D1, D2 and D3 become outputs of register 45 on respective output terminals Q0, Q1, Q2 and Q3 upon the occurrence of a clock pulse from signal command source 40. Register 45 is resettable by a reset pulse $\overline{RES}$ from signal command source 40, as during startup of the control system. As best seen in FIG. 9, outputs Q0, Q1, Q2 and Q3 of register 45 are respective logic signals LW, LS, LE and LN which are in progressive 90° phase relationship for the duration of a single energization cycle. Logic signals LN, LE, LS and LW utilized by the feedback control portion of the circuitry, as shown in block diagram form in FIGS. 4a and 4b, are obtained directly from respective output terminals Q3, Q2, Q1 and Q0 of register 45.

Output terminal Q3 of register 45 is connected to a pair of resistors 100 and 101 with resistor 100 connected at an opposite terminal to a source of voltage $V_C$ compatible with the logic levels of register 45. An opposite terminal of resistor 101 is connected to the base of a transistor 102. The emitter of transistor 102 is grounded. The collector of transistor 102 is connected to the cathode of a diode 103 and to one terminal of North field winding 25. An anode terminal of diode 103 is referenced to ground. Output terminal Q3 of register 45 sinks current from voltage supply $V_C$ through resistor 100 during a low or zero state at terminal Q3 to keep transistor 102 in a nonconductive state and field winding 25 is then unenergized. When terminal Q3 assumes a logic 1 state, transistor 102 is rendered conductive by the biasing of resistors 100 and 101 to begin sinking current from a voltage supply $V_B$ through winding 25 to ground to thereby energize winding 25.

Output terminal Q1 of register 45 provides the logic south signal LS, which is generally in 180° phase relationship to the logic north signal LN at terminal Q3.

Terminal Q1 is similarly connected to a pair of biasing resistors 104 and 105 with an opposite terminal of resistor 104 connected to positive voltage supply $V_C$. An opposite terminal of resistor 105 is connected to the base of a transistor 106. The emitter of transistor 106 is referenced to ground and the collector thereof is connected to the cathode of a diode 107 and to one terminal of South field winding 27. An opposite terminal of winding 27 is connected to positive voltage supply $V_B$ in a manner similar to winding 25, or windings 25 and 27 may be a single winding which is centertapped to voltage supply $V_B$. The anode of diode 107 is referenced to ground. Diode 107 provides an inductive current path for winding 27 when transistor 102 becomes nonconductive. Diode 103 similarly provides an inductive current path for winding 25 when transistor 106 initially becomes nonconductive. The energization condition or state of North field winding 25 is provided by a NORTH signal obtained from the terminal of winding 25 connected to the collector of transistor 102. NORTH signal provides information concerning energization of winding 25, as well as any signal induced into winding 25 by energization of winding 27 because of mutual inductance therebetween and will further provide any back EMF pulse 48 induced into winding 25 by rotor movement. In a related manner, a SOUTH signal at the terminal of winding 27 connected to the collector of transistor 106 will provide information on energization of South field winding 27 including energization caused by conduction of transistor 106, any signal induced into winding 27 by energization of North field winding 25 because of mutual inductance therebetween, and any back EMF pulse 48 induced into winding 27 by rotor movement.

The circuitry for controlling energization of East field winding 26 and West field winding 28 is similar to that for North and South field windings 25 and 27. Output Q2 of register 45 provides logic east signal LE which normally sinks current from voltage supply $V_C$ through a resistor 110. Upon occurrence of a logic 1 state at output Q2, current through resistor 110 and another resistor 111 to the base of a transistor 112 renders transistor 112 conductive to energize East field winding 26 by sinking current from voltage supply $V_B$ through East field winding 26 to ground. The cathode terminal of a diode 113 is connected to the collector of transistor 112. The anode terminal of diode 113 is referenced to ground.

Output Q0 of register 45 provides logic west signal LW. With output Q0 normally in a low or logic 0 state, output Q0 sinks current from voltage supply $V_C$ through a resistor 114. Upon the occurrence of a logic 1 state for energization of West field winding 28, current through resistor 114 is no longer diverted to ground by terminal Q0 but provides base drive through a resistor 115 to a transistor 116. Transistor 116 is then rendered conductive and energizes West field winding 28 by conducting current from voltage supply $V_B$ through winding 28 and through transistor 116 to ground. A diode 117 has its cathode terminal connected to the collector of transistor 116 and the anode terminal thereof is referenced to ground. Diode 117 provides an inductive current path for current in West field winding 28 upon transistor 112 becoming nonconductive. In a similar manner, diode 113 provides an inductive current path for East field winding 26 upon transistor 116 becoming nonductive. Field windings 26 and 28 may be separate windings with one terminal of each winding connected to voltage supply $V_B$, or windings 26 and 28 may be a single winding having a center tap to voltage supply $V_B$.

An EAST signal from the collector of transistor 112 provides information on the energization state of East field winding 26 resulting from conduction of transistor 112, signals induced into East field winding 26 by energization of West field winding 28 because of mutual inductance therebetween, and any back EMF pulse 48 induced into winding 26 by rotor movement. A WEST signal at the collector of transistor 116 similarly provides information on the energization states or signals induced into winding 28 because of mutual inductance or rotor movement. EAST and WEST signals from the respective collectors of transistors 112 and 116 are utilized in the feedback loop circuitry of FIG. 4b.

In energizing field windings 25, 26, 27 and 28 by means of respective logic signals LN, LE, LS and LW, it will be appreciated by those skilled in the art that the logic signals may have to lead the desired rotor position by greater than 180 degrees under some operating conditions. This is due to the fact that the drive angle must lead the rotor position by about 90° to obtain maximum torque and a further lead must be maintained to account for the phase lag caused by inductance in the respective field windings. Further, due to the phase difference between the peak and average values of the energization of the field windings, logic signals LN, LE, LS and LW may have to lead the rotor position by as much as about 315° in some operating conditions.

Figure 8:
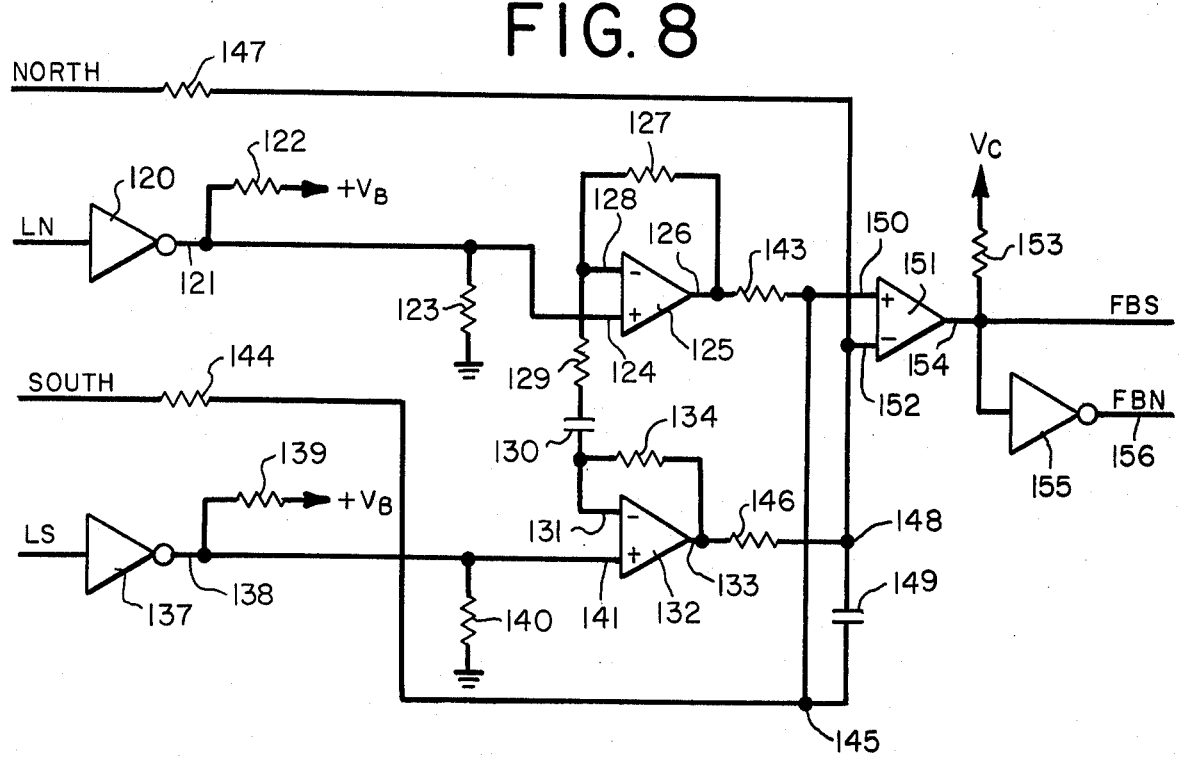
FIG. 8 is an electrical schematic diagram of the circuitry shown in block diagram form in either of FIG. 4a or 4b.

Shown in FIG. 8 is the preferred embodiment of discrete circuitry for the block diagram of FIG. 4a to utilize winding signals NORTH and SOUTH and logic north and south signals LN and LS to generate respective feedback signals FBN and FBS upon detecting back EMF wave 48 alternately induced into unenergized North and South field windings 25 and 27 by movement of rotor 31. North logic signal LN, which is graphically shown in FIG. 9 in one phase on energization, is inverted by an inverter 120 to its logic complement $\overline{LN}$ at output terminal 121 of inverter 120. Output terminal 121 is connected to a voltage divider consisting of a resistor 122 connected between terminal 121 and positive voltage supply $V_B$ and another resistor 123 connected between terminal 121 and ground. Terminal 121 is also connected to a non-inverting input 124 of a first operational amplifier 125. An output terminal 126 of amplifier 125 is connected via a feedback resistor 127 to an inverting input 128 of amplifier 125. In accordance with one aspect of the invention, inverting input 128 is also connected via a series combination of a resistor 129 and a capacitor 130 to an inverting input 131 of a second operational amplifier 132. An output terminal 133 of amplifier 132 is also connected to inverting input 131 by a feedback resistor 134. Resistors 127, 129 and 134 in combination with capacitor 130 constitute a reactive coupling network between first amplifier 125 and second amplifier 132, the operation of which will be more fully appreciated hereinafter.

Logic signal LS is inverted by an inverter 137 to provide its logic complement $\overline{LS}$ at an output terminal 138 of inverter 137. Output terminal 138 is connected to a voltage pullup resistor divider including a resistor 139 connected between terminal 138 and positive voltage supply $V_B$ and another resistor 140 connected between terminal 138 and ground. Terminal 138 is also connected to a non-inverting input 141 of second amplifier 132. The output of first amplifier 125 is summed with SOUTH signal by a resistor 143 in series with output terminal 126 and another resistor 144 in series with SOUTH signal, the resistors 143 and 144 joining at a junction 145 to provide the resultant sum. In a similar manner, the output of second amplifier 132 at output terminal 133 is summed with NORTH signal by a resistor 146 in series with output 133 and another resistor 147 in series with NORTH signal, the resistors 146 and 147 being joined at a junction 148 to provide the resultant sum. A filtering capacitor 149 between junctions 145 and 148 provides noise filtering of the respective resultant sums at these junctions. The sum of the output of first amplifier 125 and SOUTH signal are input into a non-inverting input 150 of a differential voltage comparator 151 and the resultant sum of second amplifier 132 and NORTH signal are input into an inverting input 152 of comparator 151. Comparator 151 normally sinks current from voltage supply $V_C$ through a resistor 153. Upon the detection of back EMF wave 48 superimposed upon one of the field windings, such as South field winding 27 due to rotation of rotor 31 in response to energization of North field winding 25, the output of comparator 151 at an output terminal 154 assumes a logic one state. An inverter 155 connected to output terminal 154 of comparator 151 thereupon provides north feedback signal FBN at an output terminal 156. Upon the detection of back EMF wave 48 superimposed upon signal 161 induced into North field winding 25 by energization of South field winding 27, comparator 151 provides feedback signal FBS at output terminal 154.

Operation of the feedback circuitry in FIG. 8 can better be understood in conjunction with the various signals illustrated in FIG. 9. Upon receiving a logic north pulse LN, inverter 120 transforms the positive pulse into a negative pulse $\overline{LN}$ at non-inverting input 124 of first or logic North amplifier 125. The output of amplifier 125 therefore quickly assumes a lower potential at output terminal 126, as seen in waveform LNA in FIG. 9. This negative transition of amplifier 125 is coupled by resistors 127 and 129 and capacitor 130 to inverting input 131 of second or logic south amplifier 132. Amplifier 132 responds by producing a positive going transition at output 133 as seen in waveform LSA in FIG. 9. Thereafter, as capacitor 130 begins charging toward quiescent conditions from the output of amplifier 132 through resistor 134 and from the output of amplifier 125 through resistors 127 and 129, waveform LNA at output 126 of amplifier 125 and waveform LSA at output 133 of amplifier 132 both begin to exponentially decay toward quiescent conditions with a time constant determined by the values of resistors 129, 127 and 134 and capacitor 130. This time constant is selected to equal the time constant of the exponential decay of induced signal 161 from South winding 27 which is determined by a ratio of inductance to inductive current path resistance for winding 27. To this end, resistors 129, 127 and 134 and capacitor 130 are selected for precision, such as 1% tolerance, and good temperature stability. Amplifiers 125 and 132 generate complementary portions of induced signal 160 (FIG. 5) at respective outputs 126 and 133 in response to logic north signal LN. Preferably, resistors 127 and 134 are chosen of equal ohmic value and resistor 129 is twice the resistance of resistors 127 or 134 such that amplifiers 125 and 132 generate equal complementary portions of simulated signal 160. Capacitor 130, in addition to supplying reactive coupling between amplifiers 125 and 132, also simulates the magnetic energy stored in the motor windings which is important at low motor speeds.

Figure 12:
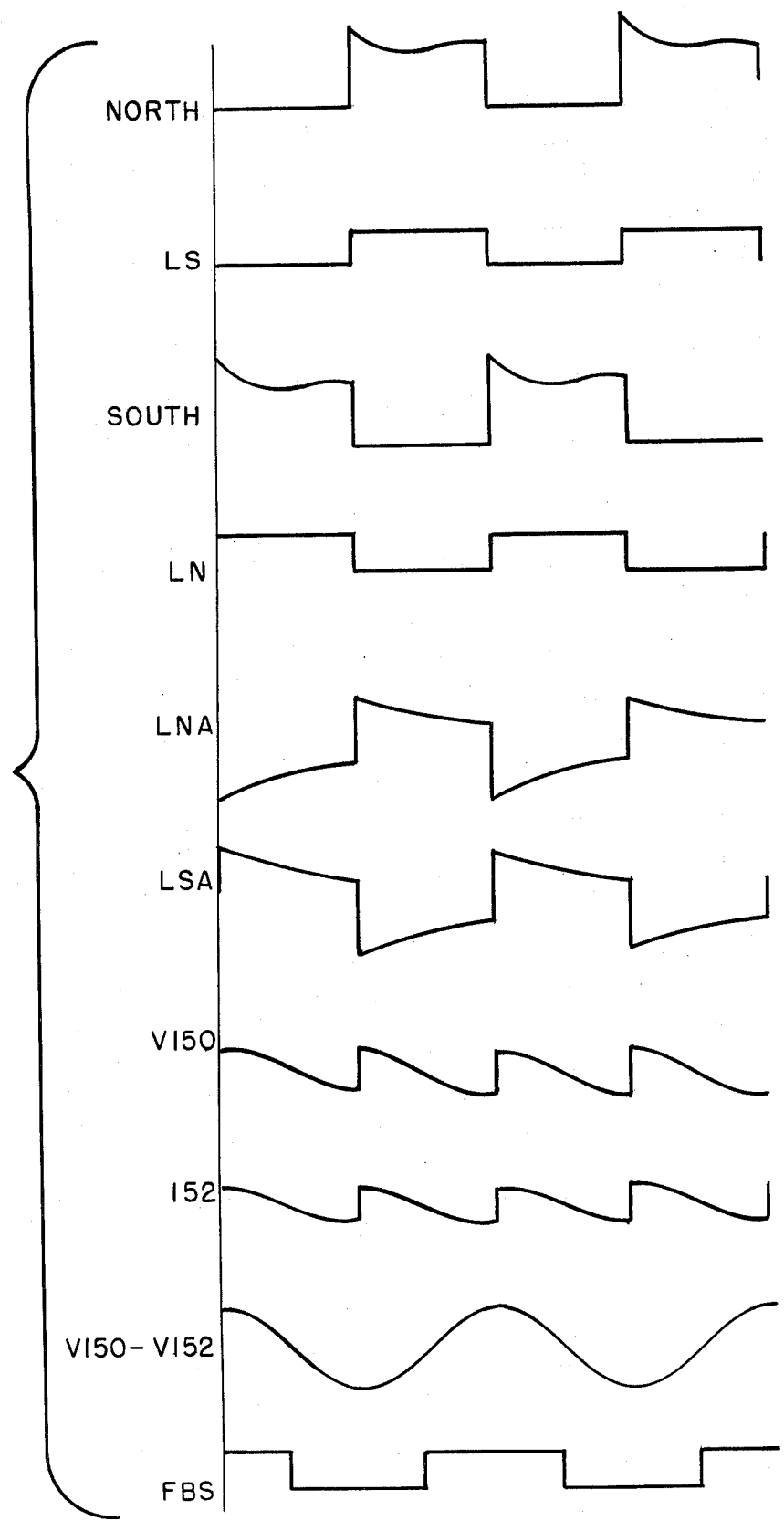
FIG. 12 is a graphic diagram of various electrical signals, similar to FIG. 9, but for two-phase-on energization of the motor windings.

At the same time that signal 160 is being simulated, SOUTH signal, as seen in FIG. 9 will be similar to signal 161 in FIG. 5 and contain back EMF wave 48 superimposed thereupon. Signals LNA and LSA will be applied to non-inverting terminal 150 and inverting terminal 152, respectively, of comparator 151 through summing resistors 143 and 146 at the same time that SOUTH signal will be applied to non-inverting input 150 of comparator 151 through summing resistor 144. The actual signals present at terminals 150 and 152 are shown in FIG. 12 as V150 and V152, respectively for two phase on energization. Summing resistors 143, 144, 146 and 147 are selected in value such that oppositely summed signals LNA and LSA at input terminals 150 and 152 will initially slightly exceed the magnitude of SOUTH signal as seen at input terminal 150 of comparator 151. The output of comparator 151 will therefore remain in a low state until back EMF wave 48 on SOUTH signal, in this instance waveform 161 in FIG. 5, exceeds oppositely summed signals LNA and LSA which yield waveform 160, whereupon comparator 151 will produce a positive output pulse FBS for the duration that waveform 161 exceeds waveform 160 in magnitude, i.e. for substantially the duration that back EMF sine wave 48 is positive.

In making this signal comparison, comparator 151 is subtracting signal V152 from signal V150 (FIG. 12) which yields signal V150-V152 which is the recovered back EMF sine wave. This sine wave is squared up into signal FBS at output 154 of comparator 151.

Circuitry in FIG. 8 will similarly simulate the signal induced into North field winding 25 by energization of South field winding 27 which is initiated by a logic south signal LS. Signal LS is inverted by inverter 137 to a negative going pulse at non-inverting input 141 of second or logic south amplifier 132. The negative pulse at input 141 causes amplifier 132 to assume a negative going potential as seen in waveform LSA in FIG. 9. This negative going potential is applied to inverting input 128 of first or logic north amplifier 125 by coupling capacitor 130 to cause a positive going transition at the output of amplifier 125. Thereafter, charging of coupling capacitor 130 from output terminal 133 of amplifier 132 through resistor 134 and from output 126 of amplifier 125 through resistors 127 and 129 will cause exponential decays in respective output signals LSA and LNA of amplifiers 132 and 125 toward quiescent conditions. Amplifiers 125 and 132 thus generate complementary portions of simulated signal 160. Signal LNA is then applied to noninverting input 150 of comparator 151 through summing resistor 143. Signal LSA from amplifier 132 and NORTH signal from North field winding 25 are applied to inverting input 152 of comparator 151 through respective summing resistors 146 and 144. Again, summing resistors 143, 144, 146 and 147 are selected such that the oppositely summed signals LNA and LSA at input terminals 150 and 152 will slightly exceed the magnitude of NORTH signal seen at terminal 152 except during the presence of positive back EMF. During positive back EMF, induced signal 161 will exceed simulated signal 160 to cause comparator 151 to generate a feedback south signal FBS on output line 154 of comparator 151.

It will be appreciated that generation of the feedback north signal FBN necessarily results in generation of another signal on feedback south lines FBS and vice versa. However, signal command source 40 can discriminate between feedback north or south signals FBN or FBS, as by comparison, of signals FBN and FBS with respective logic north or south signals LN or LS.

As can be seen from the one-phase-on energization characteristic in FIG. 9, inductive flyback pulses 170 will be present in North and South signals after energization of respective motor windings 25 and 27 is terminated by respective signals LN and LS assuming a logic zero state. In the two phase on energization characteristic of FIG. 12, these flyback pulses become masked since the inductive energy is effectively absorbed since one of the windings 25 or 27 is always energized. For example, inductive energy from winding 25 immediately after signal LN assuming a logic zero state is absorbed in winding 27 which becomes energized by signal LS simultaneously assuming a logic one state. Considerable other noise will also be present in the waveforms of FIGS. 9 and 12. Operation of the motor at slow speed can result in magnetic saturation to cause noise and signal distortion. Capacitor 149 in FIG. 8 across the input terminals of comparator 151 is generally effective in filtering such noise. The noise levels are usually therefore considerably less during energization of either winding of a mutually inductive pair than during those time periods when neither winding is energized. For this reason, two phase on energization of the windings, as shown in FIG. 12, provides the least noisy environment since one of the pair of windings is always energized. During one phase on, as shown in FIG. 9, or fractional phase on energization, considerably more noise is encountered especially when neither winding of the mutually inductive pair is energized. It is therefore an attribute of the present invention that the feedback detection is accomplished when one winding of a mutually inductive pair of windings is energized so that erroneous feedback detection due to noise is minimized.

It will be further appreciated by those skilled in the art that signal summing means 60 and 61 in FIG. 4a may be eliminated if a separate comparator is used to compare signals LNA and NORTH to provide signal FBS and another comparator is used to compare signals LSA and SOUTH to provide feedback signal FBN.

Circuitry identical to that in FIG. 8 may be utilized to complete another feedback loop associated with East field winding 26 and West field winding 28 to generate respective feedback signals FBE and FBW in the block diagram of FIG. 4b. That is, circuitry identical to FIG. 8 would be responsive to logic signals LE and LW and respective winding signals EAST and WEST to generate respective feedback signals FBE and FBW to signal command source 40.

The entire control system has good immunity to voltage supply variation in generating and comparing simulated signal 160 and induced signal 161 since logic north signal $\overline{LN}$ and logic south signal $\overline{LS}$ at respective amplifier input terminals 124 and 131 in FIG. 8 are derived from voltage supply $V_B$ which is the same voltage supply used to energize field windings 25, 26, 27 and 28 to obtain induced signal 161 from one of the windings. Simulated signal 160 generated by amplifier 125 or 132 therefore tends to track changes in magnitude of induced signal 161 due to any variation in voltage supply $V_B$.

Figures 10, 11:
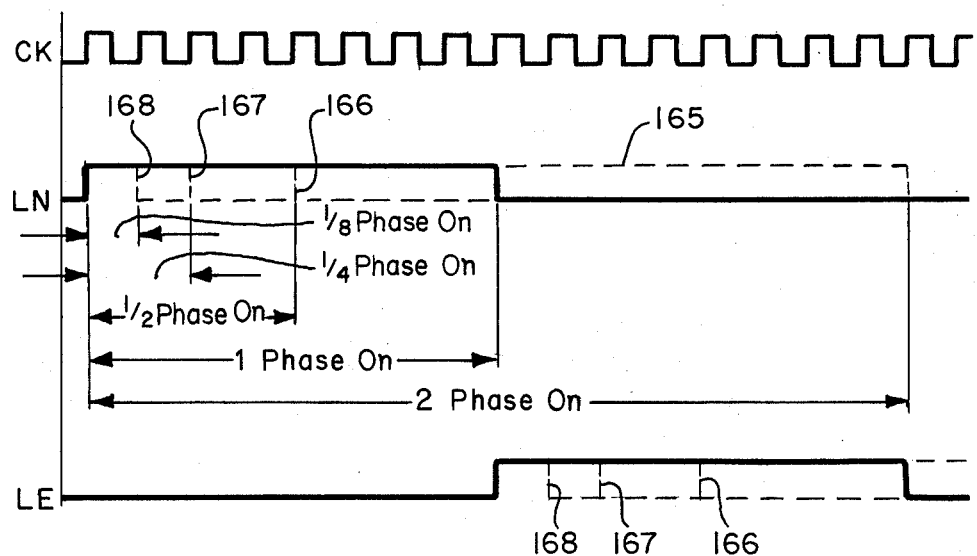

As previously pointed out, the logic signals LN, LE, LS and LW in FIG. 9 typically have successive 90° phase relationship and cause energization of respective field windings 25, 26, 27 and 28 in the well known one-phase-on energization of the windings. That is, for each interval of time only one of windings 25, 26, 27 and 28 are energized. Under the teachings of the present invention, energization of windings 25, 26, 27 and 28 may be varied anywhere between a fractional phase-on to two-phase-on. For example, if detection of back EMF pulse 48 begins to indicate that the rotor 31 is beginning to lead energization of the field windings, as by a back EMF pulse 50 illustrated in FIG. 5, it may be desirable to reduce the power applied to the field windings to correct the leading movement of the rotor. To this end, signal command source 40 may apply less than one-phase-on power to the field windings. For example and as illustrated in FIG. 10, if the clock signal CK provides eight cycles or clock pulses for each single phase-on of logic north signal LN or logic east signal LE, signal command source 40 may vary the application of power to any of the field windings 25, 26, 27 or 28 between one-eighth phase-on to two-phase-on. The heavy line in FIG. 10 indicates single-phase-on for signal LN and LE. However, if signal LN remains in a high state for an additional eight clock pulses, as indicated by dashed line 165, signal LN will keep winding 25 energized while signal LE begins energization of winding 26 in the two-phase-on mode of operation. On the other hand, if signal LN assumes a low state at dashed line 166, operation will be in the half phase on mode. Similarly, if signals LN or LE drop to a low condition at dashed line 167, operation will be in one-fourth phase-on mode or if signals LN and LE drop to a low state at dashed lines 168, operation will be in one-eighth phase on mode. It will be readily appreciated that if a higher frequency clock signal CK is utilized even smaller fractional phase on modes may be implemented. Of course, if energization of stepping motor 16 required to maintain steady state operation lies somewhere between one-phase-on and half-phase-on, signal command source 40 may at various times select either one-phase-on or half-phase-on operation to obtain the desired energization characteristic for steady state operation. Fractional phase-on may be used continuously for motor operation at slow speeds where the energization becomes essentially open loop. Otherwise, close to full energization, i.e. one-phase-on or two-phase-on energization will generally be utilized on a continuous basis where the motor is operating near full speed and/or full load.

A further example of operation of the control circuitry from fractional-phase-on to two-phase-on energization modes is shown in the logic table of FIG. 11. In this example it is assumed that there are four clock cycles for single phase on application of power to motor 16. Motor stepping angle delay T2 of signal command source 40 in FIG. 6 generates signal SPON. If SPON contains a logic one in any of the four bits, similar logic one states appear in corresponding output lines 44, 43, 42 or 41. Lines 44, 43, 42 or 41 remain in the logic one state until step pulse duration T3 of signal command source 40 generates a signal SPOFF to cause respective output lines 44, 43, 42 or 41 to again assume a logic zero state. The logic states on lines 44, 43, 42 or 41 are clocked into buffer register 45 on the next succeeding clock cycle to cause respective logic signals LN, LE, LS or LW to assume the logic state at respective ones of respective lines 44, 43, 42 or 41 at the beginning of the clock cycle. Thus, in clock cycle 1 of FIG. 11 signal LN from register 45 is at a logic one state for energization of North field winding 25 and remains in the logic one state until signal SPOFF appears during the eighth cycle and signal LN then assumes a logic zero state during the ninth cycle. Since it was assumed that four clock cycles were equal to single phase on energization, North output winding 25 has been energized in the two phase on mode by signal LN remaining at a logic one condition for eight clock cycles. During the fourth clock cycle, signal SPON assumed a logic one state in the second bit position which caused signal LE to assume a logic one condition on the fifth clock cycle. Signal LE causes energization of East field winding 26 for four clock cycles, equivalent to single phase on energization, until signal SPOFF contains a logic one state in the second bit position during the eighth cycle and signal LE then assumes a zero logic state during the ninth clock cycle. Also during the eighth clock cycle, signal SPON contained a logic one state in the third bit position to cause signal LS to assume logic one state upon the ninth clock cycle. A logic one state in the third bit position of signal SPOFF during the tenth cycle causes signal LS to assume a logic zero state upon the eleventh clock cycle such that signal LS energizes South field winding 27 for only two clock cycles, equivalent to half phase on energization. Signal SPON contains a logic one in the fourth bit position during the twelfth cycle to cause signal LW to assume a logic one condition during the thirteenth clock cycle. However, signal SPOFF contains a logic one state during the thirteenth clock cycle to cause signal LW to change to a logic zero state during the fourteenth clock cycle such that signal LW is in a logic one condition for only one clock cycle, equivalent to one-fourth phase-on energization of West field winding 28. During the sixteenth clock cycle signal SPON assumes a logic one state to again initiate energization of North field winding 25 during the seventeenth clock cycle. It will of course be understood by those skilled in the art that energization of field windings 25, 26, 27 and 28 will not typically change from two-phase-on to one-fourth phase-on during a single energization cycle of the windings, but that this energization sequence has been selected for the table in FIG. 11 primarily for better understanding of the operation and capabilities of the present invention.

With the above-described control system, an inexpensive stepping motor, for example, having a rated capability of about 300 to 400 steps per second, will perform as a much more expensive stepping motor having stepping capabilities of 3,000 or more steps per second. Since the control system utilizes readily available and inexpensive circuit elements, the cost to implement the control system is easily justifiable from an economic standpoint in view of the relative cost of high performance stepping motors to inexpensive stepping motors.

Implicit in the above discussion of the control system are methods of controlling a multi-phase motor having a plurality of electromagnetic field windings which are energizable at periodic intervals to cause rotational movement of the rotor. The basic method includes the steps of energizing at least one of the plurality of electromagnetic field windings to cause rotational movement of the rotor, inducing a signal into an unenergized winding because of mutual inductance between the energized and unenergized windings, inducing a back EMF into the unenergized winding because of rotor movement with the back EMF superimposed upon the induced signal from the energized winding, electronically simulating the signal induced into the unenergized winding because of mutual inductance between the energized and unenergized windings with the simulated signal being free or absent of any back EMF, comparing the induced signal from the unenergized winding with the back EMF superimposed thereon to the simulated signal to generate a comparison or a feedback signal upon detection of the back EMF, and using the comparison or feedback signal to control subsequent energization of the plurality of electromagnetic field windings of the motor or to control or actuate apparatus driven by the rotor. The step of electronically simulating the signal induced into the unenergized winding because of mutual inductance with the energized winding may include the substeps of inverting a logic signal used to control energization of the energized winding, inputting the inverted logic signal into a first amplifier having a reactive coupling with a second amplifier, the amplifiers thereupon generating complementary portions of the simulated signal at respective output terminals in response to the reactive coupling therebetween.

Although the illustrated embodiment shows the control system of the invention in conjunction with a permanent magnet (PM) motor, the system is also useful in conjunction with variable reluctance (VR) and hybrid motors. In VR applications the back EMF may be provided by a field induced by the energized winding into the rotor and thereby into an unenergized winding, or by a small bias current in at least some of the windings which establishes a small back EMF when none of the windings are energized.

While a particular embodiment of the invention has been shown and described, it will be obvious to those skilled in the art that changes and modifications may be made without departing from the invention in its broader aspects, and, therefore, the aim of the appended claims is to cover all such changes and modifications as fall within the true spirit and scope of the invention.

We claim:

1. A control system for controlling a motor of the type having a plurality of electromagnetic field windings adapted to be separately energized to control rotation of a rotor in the motor, at least a pair of said plurality of electromagnetic field windings having mutual inductance therebetween, rotational movement of the rotor of said motor causing a back EMF to be induced into an unenergized one of said plurality of electromagnetic field windings, said back EMF superimposed upon another signal induced into said unenergized winding due to mutual inductance between said unenergized winding and an energized winding of said plurality of windings, said control system comprising:
   electronic simulation means for simulating the signal induced into said unenergized winding due to mutual inductance with said energized winding;
   back EMF detecting means responsive to said simulated signal and to the signal induced into said unenergized winding with the back EMF superimposed thereon to develop at least one feedback signal upon detecting said back EMF; and
   motor energization control means responsive to said at least one feedback signal to control subsequent energization of said field windings whereby said control system controls rotational movement of said rotor.

2. A control system for a motor as defined in claim 1 wherein said back EMF detecting means comprise a differential voltage comparator with a first input terminal responsive to a complementary portion of said simulated signal and a second input terminal, in inverting relationship to said first terminal, responsive to the sum of another complementary portion of said simulated signal and the signal induced into said unenergized winding with the back EMF superimposed thereon, an output terminal of said comparator providing said at least one feedback signal when said back EMF causes said induced signal to exceed said simulated signal in magnitude.

3. A control system for a motor as defined in claim 2 further comprising noise filtering means connected between the input terminals of said voltage comparator.

4. A control system for a motor as defined in claim 1 further comprising electronic simulation means and back EMF detecting means for each pair of electromagnetic field windings of said motor which have mutual inductance therebetween, each of said back EMF detecting means providing at least one feedback signal to said motor energization control means.

5. A control system for a motor as defined in claim 1 wherein said motor energization control means comprises:
a signal command source for generating a plurality of time variable logic signals; and
winding driver means responsive to respective ones of said plurality of logic signals to control energization of respective ones of said plurality of electromagnetic field windings of said motor.

6. A control system for a motor as defined in claim 5 wherein said electronic simulation means is responsive to at least one logic signal of said plurality of logic signals from said signal command source to initiate simulation of said simulated signal at the same time that said winding driver means energizes said energized winding.

7. A control system for a motor as defined in claim 6 further comprising buffer register means interposed between said signal command source and said winding driver means to maintain respective logic states of said plurality of logic signals from said signal command source until a succeeding clock signal is received from said signal command source.

8. A control system for a motor as defined in claim 1 wherein said electronic simulation means comprises:
first amplifier means having a first input terminal responsive to a first of said plurality of logic signals;
second amplifier means having a first input terminal responsive to a second of said plurality of logic signals; and
reactive coupling means between an output terminal of said first amplifier means and a second input terminal of said second amplifier means and between an output terminal of said second amplifier means and a second input terminal of said first amplifier means whereby said first and second amplifier means respond to either of said first or second logic signals to generate complementary portions of said simulated signal at the respective output terminals of said first and second amplifer means.

9. A control system for a motor as defined in claim 8 wherein said reactive coupling means comprises:
a first feedback resistor connected from the second input terminal to the output terminal of said first amplifier means;
a second feedback resistor connected from the second input terminal to ther output terminal of said second amplifier means; and
resistive and capacitive circuit means connected between second input terminals of said first and second amplifier means.

10. A control system for a motor as defined in claim 5 wherein said signal command source utilizes the phase relationship of the feedback signal from said back EMF detecting means to one of said plurality of logic signals to determine the duration of subsequent energization of the windings of said motor.

11. A control system for a motor as defined in claim 10 wherein the duration of winding energization is variable between two phase on, one phase on and fractional phase on modes.

12. A control system for a motor as defined in claim 8 further comprising signal summing means interposed between said first and second amplifier means and said back EMF detecting means to sum a first winding energization signal from a first winding of a pair of windings having mutual inductance therebetween with one of the complementary portions of said simulated signal from the output terminal of said second amplifier means into a first resultant sum, said first resultant sum presented to a first input terminal of said back EMF detecting means, said summing means further summing a second winding energization signal from a second winding of said pair of windings with another of the complementary portions of said simulated signal from the output of said first amplifier means into a second resultant sum, said second resultant sum presented to a second input terminal of said back EMF detecting means.

13. A control system for a motor as defined in claim 8 wherein said first and second logic signals are in about 180° phase relationship.

14. A control system for a motor as defined in claim 8 wherein said first and second logic signals to respective first and second amplifier means are related in potential to the potential of a voltage source, said voltage source being the same voltage source used to energized said field windings whereby said simulated signal tracks the magnitude of said induced signal substantially independent of any variation in voltage supply potential.

15. A control system for a motor as defined in claim 9 wherein said capacitive circuit means is selected in capacitive value to simulate the magnetic energy stored in the motor windings.

16. A control system for a motor as defined in claim 1 wherein said motor has a permanently magnetized rotor such that said back EMF is induced into an unenergized motor winding during rotor rotation independent of energization of any of the motor windings.

17. A control system for a motor as defined in claim 1 wherein the back EMF is detected in an unenergized winding during energization of a mutually inductive winding.

18. A control system for a motor as defined in claim 1 further comprising position determining means for determining the position of apparatus driven by the motor rotor, said position determining means being responsive to said detected back EMF.

19. A control system for a motor as defined in claim 18 further comprising means for generating apparatus actuation signals when said apparatus is in a predetermined position, said actuation signals adapted to actuate said apparatus.

20. A control system for a motor as defined in claim 19 wherein said apparatus is a print head moved along a printing surface by said motor.

21. A method of controlling a motor having a plurality of electromagnetic field windings adapted to be energized at periodic intervals to cause rotational movement of a rotor of said motor, said plurality of electromagnetic field windings having mutual inductance between at least a pair of said windings, said method comprising the steps of:
 energizing at least one of said plurality of electromagnetic field windings to cause rotational movement of the rotor;
 inducing a signal into an unenergized winding of said plurality of electromagnetic field windings by means of mutual inductance between the unenergized winding and the energized winding;
 inducing a back EMF into said unenergized winding because of movement of said rotor, said back EMF superimposed upon the signal induced in the unenergized winding because of mutual inductance with said energized winding;
 electronically simulating the signal inducted into said unenergized winding due to mutual inductance with the energized winding, the simulated signal having no back EMF superimposed thereon;
 comparing the signal induced into the unenergized winding with the back EMF superimposed thereon to the simulated signal to develop a feedback signal upon detecting the back EMF; and
 controlling subsequent energization of said field windings in response to said feedback signal.

22. A method of controlling a motor as defined in claim 21 further including the step of comparing the phase of said feedback signal in relation to the energization of said energized winding to control subsequent energization field windings.

23. A method of controlling a motor as defined in claim 21 between a pair of electromagnetic field windings having about 180° phase relationship wherein the step of electronically simulating the signal induced into said unenergized winding includes the substeps of:
 inverting a logic signal used to control energization of an unenergized winding;
 presenting the inverted logic signal to an input terminal of a first amplifier means to cause a change in output of the first amplifier;
 reactively coupling the change in output of said first amplifier means to an input terminal of a second amplifier means to generate complementary portions of the simulated signal at the output terminals of said first and second amplifier means; and
 combining the complementary portions of the simulated signal at the output terminals of said first and second amplifier means by opposite polarity additive means to yield said simulated signal.

24. A method for controlling a motor as defined in claim 21 wherein detecting the back EMF by comparing the simulated signal to the induced signal is accomplished during energization of a mutually inductive winding.

25. A method for controlling a motor as defined in claim 21 wherein the motor rotor is of the permanently magnetized type and said feedback detection is independent of energization of any motor winding.

26. A method for controlling a motor as defined in claim 21 further comprising the additional step of determining the position of apparatus driven by the rotor of said motor in response to detection of said feedback signal.

27. A feedback loop in a motor control system for detecting rotation in a motor of the type having a plurality of electromagnetic field windings adapted to be separately energized to control rotation of a rotor in the motor, at least a pair of said plurality of electromagnetic field windings having mutual inductance therebetween, rotational movement of the rotor of said motor causing a back EMF to be induced into an unenergized one of said plurality of electromagnetic field windings, said back EMF superimposed upon another signal induced into said unenergized winding due to mutual inductance between said unenergized winding and an energized winding of said plurality of windings, said feedback loop comprising:
 electronic simulation means for simulating the signal induced into said unenergized winding due to mutual inductance with said energized winding;
 back EMF detecting means responsive to said simulated signal and to the signal induced into said unenergized winding with the back EMF superimposed thereon to develop at least one feedback signal upon detecting said back EMF; and
 motor energization control means responsive to said at least one feedback signal to control subsequent energization of said field windings whereby said control system controls rotational movement of said rotor.

28. A feedback loop as defined in claim 27 wherein said back EMF detecting means comprises a differential voltage comparator with a first input terminal responsive to a complementary portion of said simulated signal and a second input terminal, in inverting relationship to said first terminal, responsive to the sum of another complementary portion of said simulated signal and the signal induced into said unenergized winding with the back EMF superimposed thereon, an output terminal of said comparator providing said at least one feedback signal when said back EMF causes said induced signal to exceed said simulated signal in magnitude.

29. A feedback loop as defined in claim 27 wherein said motor energization control means comprise
 a signal command source for generating a plurality of time variable logic signals, and
 winding driver means responsive to respective ones of said plurality of logic signals to control energization of respective ones of said plurality of electromagnetic field windings of said motor, and
 wherein said electronic simulation means comprise:
 first amplifier means having a first input terminal responsive to a first of said plurality of logic signals;
 second amplifier means having a first input terminal responsive to a second of said plurality of logic signals; and
 reactive coupling means between an output terminal of said first amplifier means and a second input terminal of said second amplifier means and between an output terminal of said second amplifier means and a second input terminal of said first amplifier means whereby said first and second amplifier means respond to either of said logic signals to generate complementary portions of said simulated signal at the respective output terminals of said first and second amplifier means.

30. A feedback loop as defined in claim 29 wherein said reactive coupling means comprises:

a first feedback resistor connected from the second input terminal to the output terminal of said first amplifier means;

a second feedback resistor connected from the second input terminal to the output terminal of said second amplifier means; and resistive and capacitive circuit means connected between second input terminals of said first and second amplifier means.

31. A feedback loop as defined in claim 29 wherein said first and second logic signals to respective first and second amplifier means are related in potential to the potential of a voltage source, said voltage source being the same voltage source used to energize said field windings whereby said simulated signal tracks the magnitude of said induced signal substantially independent of any variation in voltage supply potential.

32. A feedback loop as defined in claim 30 wherein said capacitive circuit means is selected in capacitive value to simulate the magnetic energy stored in the motor windings.

33. A feedback loop as defined in claim 27 wherein said motor has a permanently magnetized rotor such that said back EMF is induced into an unenergized motor winding during rotor rotation independent of energization of any of the motor windings.

34. A feedback loop as defined in claim 27 wherein the back EMF is detected in an unenergized winding during energization of a mutually inductive winding.

35. A feedback loop as defined in claim 27 further comprising position determining means for determining the position of apparatus driven by the motor rotor, said position determining means being responsive to said detected back EMF.

36. A control system for controlling the position of apparatus driven by a direct current motor of the type having a plurality of electromagnetic field windings adapted to be sequentially energized to control rotation of a rotor in the motor, at least a pair of said plurality of electromagnetic field windings having mutual inductance therebetween, rotational movement of the rotor of said motor causing a back EMF to be induced into an unenergized one of said plurality of electromagnetic field windings, said back EMF superimposed upon another signal induced into said unenergized winding due to mutual inductance between said unenergized winding and an energized winding of said plurality of windings, said position control system comprising:

feedback loop means for simulating the signal induced into said unenergized winding due to mutual inductance with said energized winding and comparing said simulated signal to said induced signal to recover said back EMF; and means responsive to said recovered back EMF to determine the present position of said apparatus.

37. A control system as defined in claim 36 further comprising actuation means to actuate said apparatus when said apparatus is positioned in a predetermined position.

38. A control system in a teleprinter for controlling the position of a print head operatively positioned by a direct current motor of the type having a plurality of electromagnetic field windings adapted to be sequentially energized to control rotation of a rotor in the motor, at least a pair of said plurality of electromagnetic field windings having mutual inductance therebetween, rotational movement of the rotor of said motor causing a back EMF to be induced into an unenergized one of said plurality of electromagnetic field windings, said back EMF superimposed upon another signal induced into said unenergized winding due to mutual inductance between said unenergized winding and an energized winding of said plurality of windings, said control system comprising:

electronic simulation means for simulating the signal induced into said unenergized winding due to mutual inductance with said energized winding;

back EMF detecting means responsive to said simulated signal and to the signal induced into said unenergized winding with the back EMF superimposed thereon to develop at least one feedback signal upon detecting said back EMF; and motor energization control means responsive to said at least one feedback signal to control subsequent energization of said field windings whereby said control system controls rotational movement of said rotor to position said print head in a predetermined position.

39. A control system as defined in claim 38 further comprising actuation means to actuate said print head when said apparatus is positioned in a predetermined position.

40. A control system for a teleprinter as defined in claim 38 wherein said back EMF detecting means comprise a differential voltage comparator with a first input terminal responsive to a complementary portion of said simulated signal, and a second input terminal, in inverting relationship to said first terminal, responsive to the sum of another complementary portion of said simulated signal and the signal induced into said unenergized winding with the back EMF superimposed thereon, an output terminal of said comparator providing said at least one feedback signal when said back EMF causes said induced signal to exceed said simulated signal in magnitude.

* * * * *